Feb. 23, 1965 H. MÖNNICH 3,170,284
SCREW PROPELLER PROPULSION DEVICES
Filed July 30, 1963
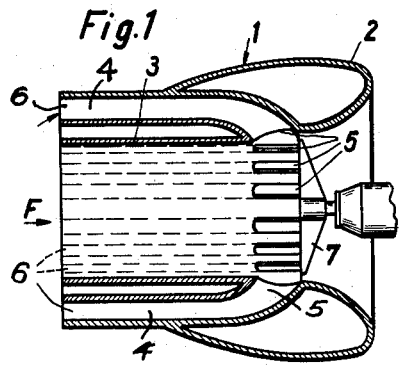
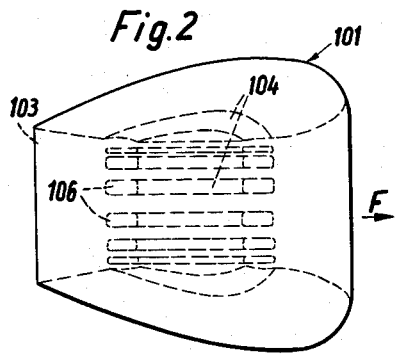
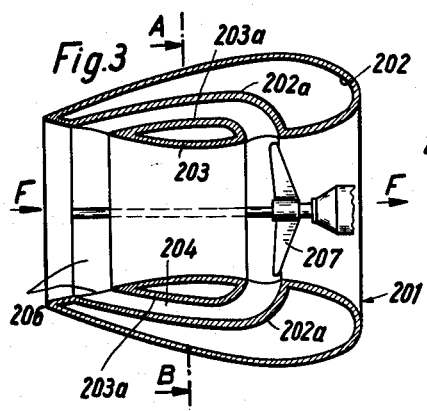
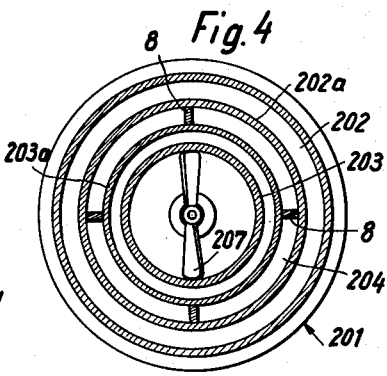
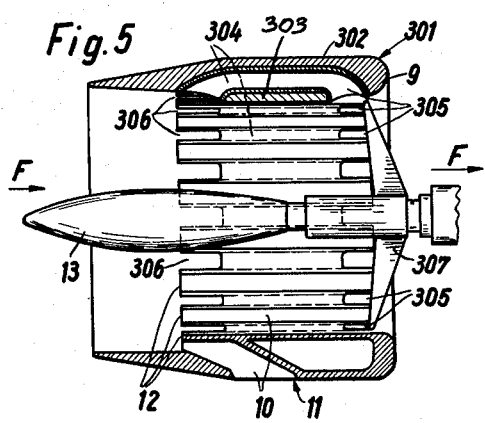
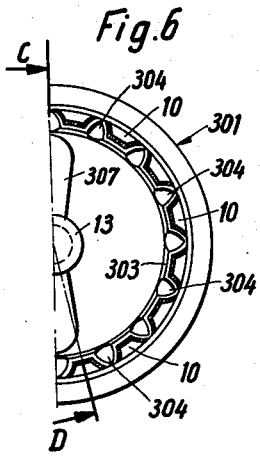
Inventor:
Herbert Mönnich
by Singer, Stern & Carlberg
Attorneys 
United States Patent Office 3,170,284
Patented Feb. 23, 1965

3,170,284
SCREW PROPELLER PROPULSION DEVICES
Herbert Mönnich, Gut Weilen 11, Bremen,
St. Magnus, Germany
Filed July 30, 1963, Ser. No. 298,644
Claims priority, application Germany, Nov. 19, 1962,
M 54,866
9 Claims. (Cl. 60—35.5)

This invention relates to improvements in screw propeller propulsion devices and is directed particularly to a double walled guide ring for ship propellers, aircraft propellers, or the like. This guide ring has an inlet cross section for a fluid medium which is enlarged in front of the plane of the screw propeller in the form of a flared nozzle in which the screw propeller operates in the manner of an axial pump. With such guide rings there is obtained a local pressure reduction which begins at the front edge of the nozzle and changes gradually to the normal pressure in the plane of the screw propeller. Thus, no increase in pressure is obtained in or behind the plane of the screw propeller as it occurs with a freely operating propeller, even though in limited form.

Since the effective thrust to be obtained by a screw propeller for a given diameter of the propeller is dependent upon the pressure difference in front of and behind the plane of the propeller, there is obtained with a ship's screw propeller with a nozzle-like guide ring an increase in thrust if there is obtained behind the plane of the screw propeller the greatest possible increase in pressure.

This problem forms the basis of the present invention and is attained when the inner wall of the guide ring is provided with inlet openings arranged substantially at the tips of the screw propeller. These inlet openings are connected to outlet openings by means of a common annular duct formed between the two concentrically arranged circular walls of the guide ring or passing through the outer circular wall of the guide ring, or by individual ducts arranged in the same manner as the annular duct. The outlet openings are arranged in the rear third part of the inner circular wall or at the end of the outer wall of the guide ring.

According to one construction of the invention the individual inlet and outlet openings are distributed as uniformly as possible along the periphery in the form of elongated slots which extend in the direction of the guide ring axis or may be of a rounded section or may consist of a continuous annular slot.

Experiments have shown that the thrust of the screw propeller is increased by the employment of the present invention. According to the invention an additional pressure difference is obtained in the plane of the screw propeller so that the thrust action of the nozzle is substantially improved.

The invention is furthermore directed to the problem of overcoming the factors interfering with free travel, namely the piling up of pressure against the nozzle which necessarily occurs in the inlet part of the nozzle which is of progressively smaller dimensions, without thereby affecting the basic effect of the invention, namely an unhindered drop in pressure in the plane of the screw propeller.

The particular difficulty of this problem lies in a considerably reduced effect on the water or other medium with a considerably reduced inlet section or in the absence of such an inlet. With such a guide ring the screw propeller will on the one hand simply receive no more water or other fluid than if it were not surrounded by a casing, and on the other hand its jet must fill out the guide ring in such a manner that no cavitation can appear at its walls since otherwise the overall thrust effect would be still worse than with a free screw propeller not surrounded by a casing.

These difficulties are overcome according to the invention with a considerably reduced inlet section or in the absence of such a section by a cylindrical enlargement of the inner wall of the guide ring, which enlargement is provided at a definite distance behind the screw propeller commencing in stages or tseps, wherein the outlet openings of the individual ducts lie partially in the step and, intermediately, the outlet openings of a second duct system for additional medium are provided, the inlet openings of which are arranged at the maximum periphery of the outer wall or where, in the case of a ring duct guide, the outlet openings can in some cases occupy the whole step of widening out, the additional medium system may also consist of a ring duct which overlies the former in such a manner that its outlet opening lies wholly or partially directly behind the step in the widening part and where in addition a guide body is provided lying coaxially to the screw propeller and commencing against the flattened hub end portion thereof.

A pear-shaped guide body offering the minimum resistance and which represents to some extent an extension of the screw hub, has proved a suitable means in association with the other features of the invention in order to obtain even with a reduced screw propeller action the necessary filling out of the jet into the guide ring according to the invention. The correctly proportioned slope of such a guide body guides the jet not only against the inner wall of the guide ring so that it adheres thereto, but also in such a manner as to exert suction on the outlet openings disposed therein. Thereby the jet from the screw is amplified by the amount of the water passing through these openings.

Moreover, the screw jet often receives a necessary further amplification which is obtained by the additional water or fluid referred to which is drawn off from the openings behind the greatest diameter of the outer wall of the guide ring from the surrounding zone and draws it or feeds it between the individual ducts into the inner wall of the guide ring.

A particularly favorable arrangement is obtained if the end of the enlarged part of the inner wall of the guide ring which in the normal case, i.e. with the usual nozzles, conically shaped, has the form of a cylinder commencing with a stepped formation and in the steps of which are disposed both the outlet openings of the duct system according to the invention and also, intermediately, the outlet openings of the additional water or medium system, in which always sufficient water is available for the jet and wherein also a generally favorable and actually optimum ratio of the jet and craft speeds is automatically obtained.

With the nozzle-like annular duct construction of the character already referred to it is necessary to feed the additional water or other medium likewise by means of an annular duct system which overlies the first annular duct. In such a case the enlarged section of the guide ring wall is in some cases already completely or in part occupied by the mouth of the annular duct and consequently the mouth of the annular duct for the additional medium cannot lie entirely at that point but must lie wholly or partly behind it in the enlarged part.

Technical experiments have confirmed the improvement in the thrust by means of these devices with a guide ring with a considerably reduced inlet part, or in the absence of such an inlet part, in towing and in the free travel of a free screw propeller surrounded by a casing.

Furthermore it should be stated that the invention is applicable analogously to an air screw propeller.

Constructional examples of the invention which have proved desirable in practice are described hereinafter as applied to ship propeller screws, with reference to the accompanying drawings, wherein:

FIG. 1 is a longitudinal sectional view of one embodiment;

FIG. 2 is a side elevation view of another embodiment;

FIG. 3 is a longitudinal sectional view of a third embodiment;

FIG. 4 is a cross sectional view along the line A–B in FIG. 3;

FIG. 5 shows a further embodiment of a guide ring in a longitudinal sectional view along the lines C–D in FIG. 6, and FIG. 6 is a partial end elevation view of FIG. 5.

In all embodiments of the invention, the guide ring consists of an outer circular wall and an inner circular wall and the movement of the ship or aircraft is assumed to be in the direction of the arrow F. In FIG. 1, the outer circular wall of the guide ring 1 is shown at 2 and the inner circular wall at 3. Longitudinally extending ducts 4 are disposed between these concentric circular walls with inlet openings 5 and outlet openings 6 for the water or air, respectively. The inlet openings 5 are disposed in the inner wall 3 and the ducts 4 terminate in the outlet openings 6 externally of the outer circular wall 2. The peripheral path of the outer tips of the screw propeller 7 lies in the region of the front parts of the inlet openings 5, preferably at the front edge thereof.

The construction of the guide ring 101 according to FIG. 2 differs from the embodiment of FIG. 1 essentially by the fact that the outlet openings 106 of the ducts 104 open into the inner circular wall 103.

In the embodiment according to FIGS. 3 and 4 an annular space 204 is provided between the outer circular wall 202 and the inner circular wall 203. This annular space 204 takes the place of the ducts 4 and 104 in FIGS. 1 and 2 respectively. The two concentric circular walls 202a, 203a are supported one from the other by radial fins 8 of which four are shown in FIG. 4. Also with this embodiment the periphery of the screw propeller 207 lies in the region of the forward edge of the annular duct 204, and the annular outlet opening 206 is arranged in the inner wall 203 and is spaced inwardly from the rear end of the guide ring 201.

In the embodiment of the invention according to FIGS. 5 and 6, the guide ring 301 has outer and inner circular walls 302 and 303 respectively. The guide ring 301 is provided with a reduced inlet for which purpose the ring 301 is provided preferably with a rounded inwardly extending edge 9. Between the concentrically spaced outer wall 302 and inner wall 303 the ducts 304 are arranged, for example in the form of a lengthwise extending series of tubes which at the same time support the two circular walls 302, 303 one from the other. The inlet openings 305 and the outlet openings 306 of the ducts 304 open into the inner circular wall 303. Furthermore, the outlet openings 306 open into an inwardly facing portion of the guide ring 301 between the axially spaced inlet portions of the walls 302 and 303.

Additional ducts 10 are provided between the ducts or tubes 304 and serve as additional water pipes having inlet openings 11 in the outer wall 302 between the inlet and outlet openings of the ducts 304, while the outlet openings 12 of the ducts 10 terminate at the inwardly directed end of the ring 301 formed by the two concentric wall portions 302 and 303. The screw propeller 307 is located in the region of the inlet openings 305 of the ducts 304 and a pear-shaped guide body 13 extends axially from a point outside of the outlet of the guide ring 301 to a point within the guide ring, in fact, it extends to a point adjacent the screw propeller 307.

In all embodiments of the invention the double walled guide ring has a smoothly contracting inlet portion through which the water is propelled by the action of the screw propellers 7, 207 and 307 respectively. The screw propeller forces the water into a ductway which has a minimum cross-sectional area at a point lying beyond the screw propeller and then expands in a smooth and progressive manner. The inlets of the ductways 4, 204 and 304 respectively, lie immediately beyond the tips of the screw propeller, but at a portion of the ductway in advance of the point where the minimum cross section is reached, while the outlets of the ductways 4, 204, 304 are located at or towards the outer end of the guide ring where the diameter is somewhat greater than the minimum diameter.

The outer configuration of the guide ring is preferably also of smoothly curved form and embodies a maximum diameter portion near the leading end, smoothly tapering towards a minimum diameter portion at the rear end.

What I claim is:

1. In a screw propeller propulsion device, comprising a screw propeller for driving a craft in a forward direction, a guide ring having front and rear ends surrounding the propeller and extending in a direction opposite to the direction of propulsion, inner and outer walls on said guide ring forming a ductway therebetween, said inner wall being provided with an inlet opening adjacent the front end of said guide ring and in communication with the interior of said ring, said screw propeller being disposed in said guide ring with its peripheral edges adjacent said inlet opening and disposed forwardly thereof, said ductway being provided with an outlet adjacent the rear end of said guide ring.

2. In a screw propeller propulsion device as set forth in claim 1, wherein said inlet opening is provided in the inner wall of said guide ring at a point lying immediately beyond the periphery of the screw propeller and said outlet is disposed toward the rear portion of said guide ring.

3. In a screw propeller propulsion device as set forth in claim 1, in which the inner wall provides a fluid flow ductway in which certain portions are reduced to a minimum and are increased to greater dimensions, said screw propeller being disposed in advance and forwardly of said reduced portions and said inlet openings being disposed adjacent the front end of said guide ring and between said screw propeller and said certain reduced minimum portions, and outlet openings at the rear end of said guide ring rearwardly of said certain reduced portions.

4. In a screw propeller propulsion device, a guide ring of double walled construction having spaced inner and outer walls forming a fluid passage therebetween, said guide ring being provided with a central passage, a screw propeller mounted in said passage with its axis extending longitudinally thereof, said inner wall being provided with inlet openings adjacent the front end of said ring and lying at a point transversely of the axis of the propeller adjacent the periphery thereof and within a radial plane containing the tips of the propeller blades, said inner wall being provided with an internal diameter approximating the diameter of the propeller, and said guide ring being provided with outlet openings at the rear thereof, said inlet and outlet openings being in communication with a common annular duct formed within the guide ring and being arranged in approximately the rear third part of said ring.

5. In a screw propeller propulsion device as set forth in claim 4, in which said inlet and outlet openings are formed by a series of equidistantly spaced longitudinally extending slots in the inner wall extending in a direction parallel with the direction of the propeller shaft axis, said openings being disposed behind and rearwardly of the periphery of said propeller.

6. In a screw propeller propulsion device as set forth in claim 4, in which said inlet and outlet openings are formed by annular slots arranged forwardly and rearwardly of said guide ring.

7. In a screw propeller propulsion device as set forth in claim 4, in which said inner wall is reduced in diameter adjacent its central portion which is tapered forwardly to the inlet portion of said passage with said reduced wall portion being arranged rearwardly of the screw propeller, said inner wall being increased in diameter rearwardly of said decreased diametral portion with the outlet openings arranged intermediate said reduced diametral portion and the end of said ring.

8. In a screw propeller propulsion device as set forth in claim 4, including an additional duct system for additional fluid having inlet openings in the outer wall and outlet openings in alignment with the outlet openings of said common duct, said second duct system being formed of an annular duct which overlies the common duct in such a manner that its outlet opening lies directly behind a stepped portion in the enlarged rear end of said guide ring thus forming a guide body extending coaxially of the screw propeller axis and projecting rearwardly of a flattened hub thereof.

9. In a screw propeller propulsion device as set forth in claim 8, in which said guide ring is provided with a maximum external diameter which is disposed rearwardly to form a tapered portion terminating adjacent said outlet and which is of maximum diameter adjacent the forward end of the ring and the reduced diametral portion of said inner wall.

References Cited by the Examiner

UNITED STATES PATENTS

| | | | |
|---|---|---|---|
| 451,086 | 4/91 | Toliver | 115—42 |
| 1,825,305 | 9/31 | Chillingworth | 244—15 |
| 2,014,051 | 9/35 | Nishi | 244—23 |
| 2,555,576 | 6/51 | Criqui | 230—122 |
| 3,115,112 | 12/63 | Erlbacher | 103—89 X |

FOREIGN PATENTS 16,854    1891    Great Britain.

JULIUS E. WEST, *Primary Examiner.*